(12) United States Patent
Barker et al.

(10) Patent No.: US 7,447,663 B1
(45) Date of Patent: Nov. 4, 2008

(54) METHOD FOR ON-LINE CLIENT SET-UP AND AUTHORIZATION OF AUTOMATIC ELECTRONIC FUNDS TRANSFERS

(75) Inventors: Timothy Gerhard Barker, Coon Rapids, MN (US); Heidi Anne Gaughan, St. Louis Park, MN (US); Sakira Maria Henry, Douglasville, GA (US)

(73) Assignee: Ameriprise Financial, Inc., Minneapolis, MN (US)

( * ) Notice: Subject to any disclaimer, the term of this patent is extended or adjusted under 35 U.S.C. 154(b) by 413 days.

(21) Appl. No.: 10/659,123

(22) Filed: Sep. 10, 2003

(51) Int. Cl.
*G06F 17/60* (2006.01)

(52) U.S. Cl. .............................. 705/78; 705/67; 705/68

(58) Field of Classification Search .................. 705/78, 705/67, 68
See application file for complete search history.

(56) References Cited

U.S. PATENT DOCUMENTS

| | | |
|---|---|---|
| 5,684,965 A | 11/1997 | Pickering |
| 5,956,700 A | 9/1999 | Landry |
| 6,119,107 A | 9/2000 | Polk |
| 6,173,272 B1 | 1/2001 | Thomas et al. |
| 6,202,054 B1 | 3/2001 | Lawlor et al. |
| 6,233,565 B1 | 5/2001 | Lewis et al. |
| 6,243,689 B1 | 6/2001 | Norton |
| 6,317,745 B1 | 11/2001 | Thomas et al. |
| 6,332,134 B1 | 12/2001 | Foster |
| 2001/0000535 A1 | 4/2001 | Lapsley et al. |
| 2001/0001321 A1 | 5/2001 | Resnick et al. |
| 2001/0037290 A1 | 11/2001 | Lai |
| 2002/0013767 A1 | 1/2002 | Katz |
| 2002/0016763 A1 | 2/2002 | March |
| 2002/0016765 A1 | 2/2002 | Sacks |
| 2002/0038289 A1* | 3/2002 | Lawlor et al. .................. 705/42 |
| 2002/0042773 A1 | 4/2002 | Fugitte et al. |
| 2002/0052841 A1 | 5/2002 | Guthrie et al. |
| 2002/0087461 A1 | 7/2002 | Ganesan et al. |
| 2002/0091635 A1 | 7/2002 | Dilip et al. |
| 2002/0111915 A1 | 8/2002 | Clemens et al. |
| 2002/0116331 A1 | 8/2002 | Cataline et al. |
| 2002/0120537 A1 | 8/2002 | Morea et al. |
| 2002/0147682 A1 | 10/2002 | Price et al. |
| 2002/0152124 A1 | 10/2002 | Guzman et al. |
| 2002/0152160 A1 | 10/2002 | Allen-Rouman et al. |
| 2002/0161707 A1 | 10/2002 | Cole et al. |

(Continued)

FOREIGN PATENT DOCUMENTS

| JP | 2007116281 A * | 5/2007 |
|---|---|---|

*Primary Examiner*—Pierre E Elisca
(74) *Attorney, Agent, or Firm*—Snell & Wilmer L.L.P.

(57) ABSTRACT

There is provided a method for a client to authorize an automated clearance house (ACH) transaction comprising the steps of providing an online web interface on a financial services provider network, allowing a client to securely access the online web interface via a client computer having a web browser application, permitting the client to input set-up and authorization information and criteria via the client computer, accepting and acknowledging the client set-up and authorization information and criteria, and executing an authorized ACH transaction based on the client inputted set-up and authorization information and criteria to electronically transfer client funds between one or more client accounts at a third party financial institution and financial service provider. The authorized ACH transactions can be a recurring, non-recurring or one-time ACH transactions, and in particular ACH-in transaction.

13 Claims, 2 Drawing Sheets

U.S. PATENT DOCUMENTS

| | | |
|---|---|---|
| 2002/0174066 A1 | 11/2002 | Kleckner et al. |
| 2002/0178112 A1 | 11/2002 | Goeller et al. |
| 2002/0198829 A1 | 12/2002 | Ludwig et al. |
| 2003/0004867 A1 | 1/2003 | Kight et al. |
| 2003/0018554 A1 | 1/2003 | Lyftogt et al. |
| 2003/0125969 A1* | 7/2003 | Kizer et al. .................... 705/1 |
| 2003/0158811 A1* | 8/2003 | Sanders et al. ................ 705/39 |

* cited by examiner

METHOD FOR ON-LINE CLIENT SET-UP AND AUTHORIZATION OF AUTOMATIC ELECTRONIC FUNDS TRANSFERS

TECHNICAL FIELD

The present subject matter generally relates to computerized information systems and financial services and products. More particularly, the subject matter relates to a method that provides clients an on-line capability to set-up and authorize, via a computer network, the electronic transfer of funds from a client account at a financial institution to a designated client account at another financial institution.

BACKGROUND

Financial services companies offer a variety of products and services to individual consumers that include investment and retirement products and services. The financial products and services enable individual consumers or clients to pursue their financial goals and objectives through investment and retirement accounts which can include investment in stocks, mutual finds, individual retirement accounts (IRAs), rollover IRAs, insurance certificates and annuities, among other investments choices. Financial service companies typically require an initial deposit or submission of capital from individuals or clients to enable participation in the investment or retirement product and service managed and administered by the financial services company. The financial services company manages and directs the investment of the client's capital or funds in a manner that corresponds to the type of financial product that the client has chosen to participate in. For example, the investment vehicle may be a conservative or aggressive investment vehicle, or it may be designed to invest in one company or one industry, or it may be designed to be invested in a diversified manner.

Financial services companies administering and directing such investment products and services typically require individual investor clients to submit or deposit additional funds or monetary resources so that the investment accounts or products being managed and administered by the financial client's services company are properly funded. The amount of funds required from the client can be a fixed or a varying amount, and the requirement that the client deposit funds may occur on a regular or periodic basis, e.g., monthly, semi-annually, or yearly. The need for additional client funds may also be a one-time requirement or may be on an irregular or conditional basis, e.g., when a client's account balance falls below a designated threshold amount.

Existing methods and processes for clients to submit or deposit funds into their investment accounts includes physical submission of paper instruments, e.g., personal checks, by the client for the amount of funds required and submitted during a time frame indicated by the financial services company. The financial services company can then receive the client funds from a client financial institution, e.g., a bank, upon presentment of the submitted paper instrument to the client's financial institution. A client may also provide authorization of electronic funds transfer to the appropriate client accounts in the financial services company by providing verbal authorization for such transfer. Verbal authorization can be carried out via telephone communication between the client and a designated service representative of the financial services company. The client can subsequently submit voided paper checks and other client information in order to complete the authorized transfer of client funds from a client account at a financial institution, such as a bank, to the client's account at the financial service company. Some of the methods used can be carried out by the Automated Clearing House (ACH) Network. The ACH Network is an electronic funds transfer system governed by a certain set of operating rules which provide for the interbank clearing of electronic payments for participating financial institutions. An ACH transaction generally requires an originator (such as an individual or a corporation) to initiate instructions to an originating depository financial institution. The originating financial institution then provides instructions to an ACH operator. The ACH operator (such as The American Clearing House Association or Federal Reserve) then provides the instructions to a receiving depository institution. The receiving depository institution then makes the funds available to the receiver (another individual or corporation) which in turn provides a report on its statement.

Existing methods and processes of moving client funds from the client's account at a financial institution, such as a bank, to one or more client accounts in a financial services company have drawbacks. When the process uses a live customer or service representative on the part of the financial services company, the client may be limited as to when client can initiate a call to authorize a funds transfer. For example, the client may be limited to calling a service representative during the week, Monday through Friday between 9:00 AM and 5:00 PM. This can be inconvenient if the client cannot call during the set days and times. Also, providing live person service representatives and their associated equipment for interacting with a client can be a large expense for the financial services company. The need for a client to mail additional client information such as a voided paper check will delay the actual authorization for funds transfer by the amount of time required for the mail to arrive with the client's information. This can be inconvenient if there is a pressing need to authorize the transfer funds quickly. Further, the need for a financial services company to process paper checks can be time consuming and results in increased processing costs.

There is thus a need to provide a capability for client to setup and authorize the automatic electronic transfer of client funds from a client account at one financial institution to a designated client account at another financial institution, such as a financial services provider, without the need to interact with customer or service representatives, or the need to submit voided paper instruments via a mail carrier.

SUMMARY

The present system provides a method for enabling a client to individually setup and authorize an ACH transaction, via an on-line computer system or web interface, for the automatic electronic transfer of client finds from a client account at one financial institution to a client designated account at another financial institution, such as a financial services company or provider. The method for a client to authorize an (ACH) transaction comprises the steps of providing an online web interface on a financial services provider network, allowing a client to securely access the online web interface, permitting the client to input set-up and authorization information and criteria, accepting and acknowledging the client set-up and authorization information and criteria, and executing an authorized ACH transaction based on the client inputted set-up and authorization information and criteria to thereby electronically transfer client funds between one or more client accounts at a third party financial institution and financial service provider. This method can further comprise the steps of enabling the client to modify the set-up and authorization information and criteria, accepting and acknowledging the modified client set-up and authorization information and criteria, and notifying the client of the executed ACH transaction.

The ACH transactions setup and authorized by a client using this method can be recurring, non-recurring or one-time ACH transaction. The client can accesses the online web interface and input set-up and authorization information and criteria via a client computer having a web browser application. Also, the client inputted set-up and authorization information and criteria can comprise, among other information, routing numbers for a client third party financial institution, at least one client account number at the client third party financial institution and financial service provider, and amount of funds to be transferred between at least one client account in the client third party financial institution and at least one client account at the financial service provider It is an objective to provide a method for enabling a client to individually setup and authorize ACH transactions in an individual self-service manner without the need to interact with a customer or service representative of the financial services provider.

It is also an objective to provide a method for enabling a client to setup and authorize ACH transactions that will be carried out according to criteria provided by the client.

It is an objective to provide a method for enabling a client to setup and authorize ACH transactions where the client can change, update or modify client information, parameters or criteria subsequent to the initial client set-up and authorization.

It is an objective to provide a method for enabling a client to setup and authorize ACH transactions in an on-line or web-interface environment without the need to submit voided paper instruments to the financial services provider via a mail carrier.

Additional objects, advantages and novel features of the examples will be set forth in part in the description which follows, and in part will become apparent to those of ordinary skill in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements. The description may be better understood when read in connection with the accompanying drawings, of which.

DETAILED DESCRIPTION

The present system and method provides clients of financial services providers, such as American Express Financial Services, with a method that enables clients to individually setup and authorize, via the financial services provider on-line or web computing facilities, the electronic transfer of client funds into client selected accounts at the financial services provider from the client's third party financial banking institution.

Figure 1:
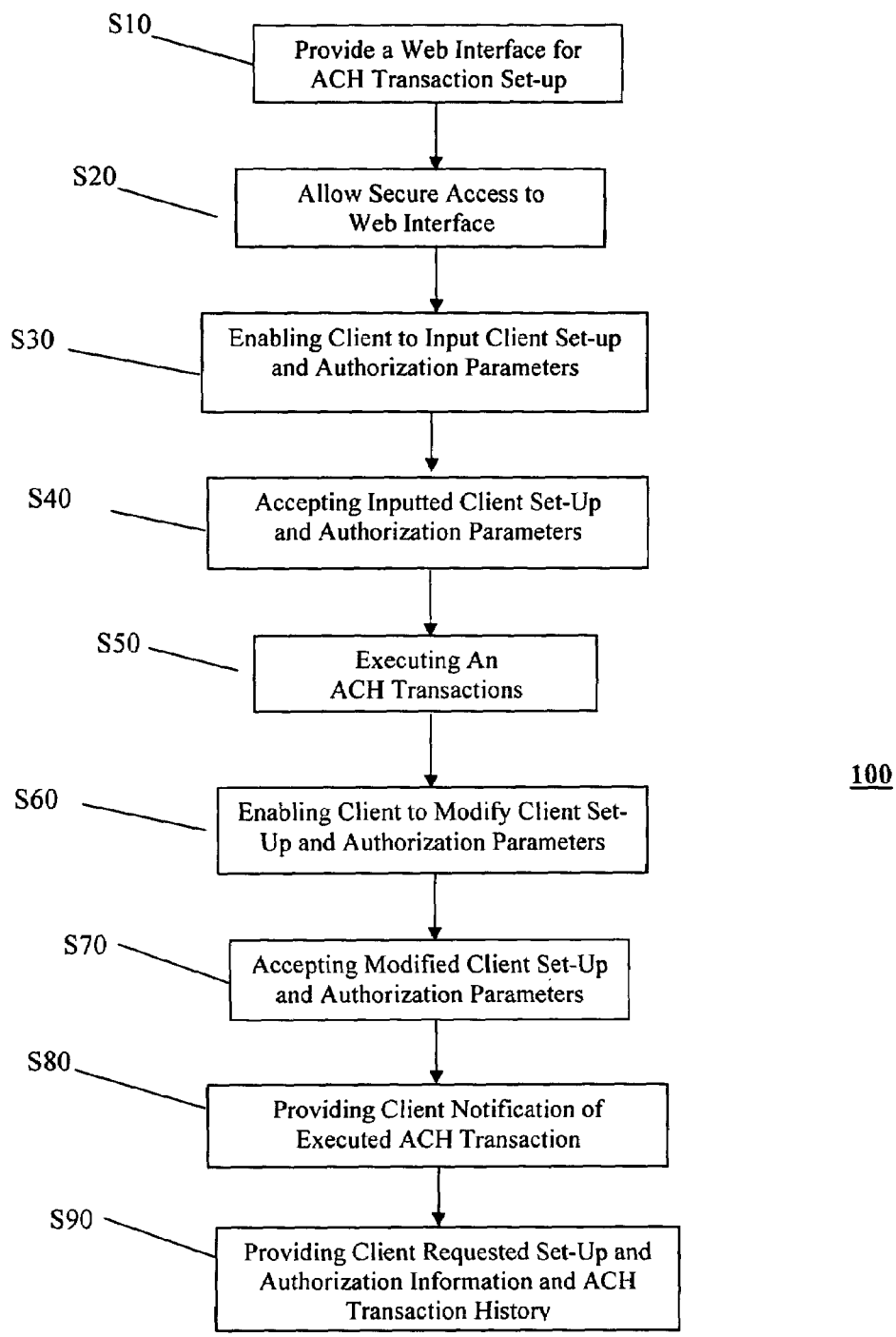
FIG. 1 illustrates a flow chart of the steps of a method for enabling a client to setup and authorize an automated clearing house transaction according to one aspect of the present subject matter.
Figure 2:
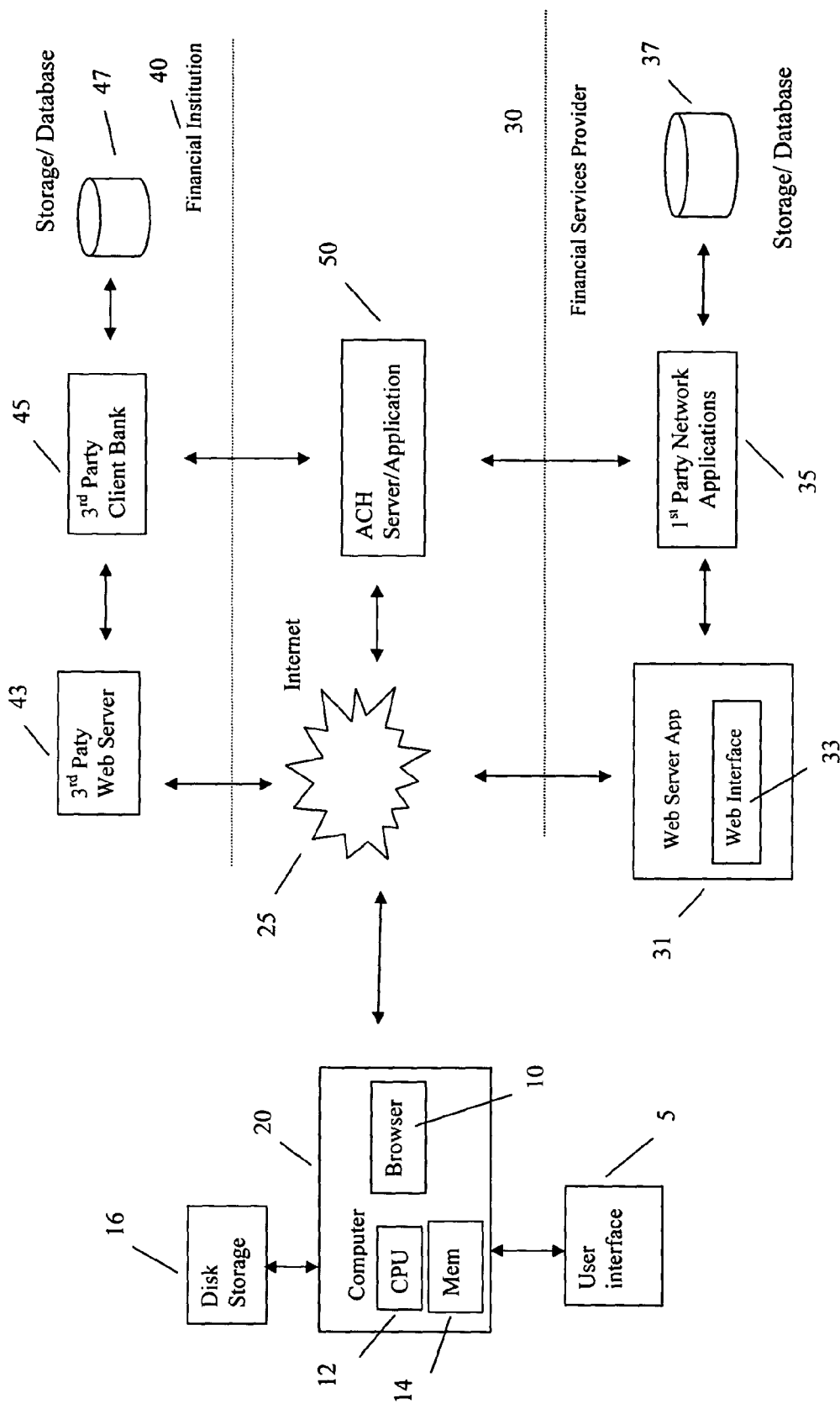
FIG. 2 illustrates a block diagram representation of a computer system where the method of FIG. 1 can be implemented.

Referring to FIG. 1, there is shown a flow chart of the steps of one example of a method 100 for enabling a client to individually setup and authorize the automatic electronic transfer of client funds through an automated clearing house (ACH) transaction by using an on-line or web interface provided by a financial services provider 30 (shown in FIG. 2). FIG. 2 shows a block diagram of a system 200 where the method 100 of FIG. 1 can be implemented.

In Step S10, an online or web interface 33 is provided by a financial services provider 30 for use by a client having one or more accounts with the financial services provider 30. The online or web interface 33 is a computer program or application that will enable a client to setup and authorize the automatic occurrence of ACH transactions. In one example, the client will preferably setup and authorize ACH-in transactions, where funds will be electronically transferred from designated client accounts 47 is one financial or banking institution 40 and delivered into one or more designated client accounts 37 at another client financial services company or provider 30. The first financial institution can include banks, credit units and other financial institutions that can carry out ACH transactions.

The web interface 33 is a computer program or application that is preferably loaded on a web server machine where it can be accessed by one or more clients using a browser application or program 10 loaded on a client computer 20. A client can access the web interface 33 via a public interconnected network or internet 25 by entering the appropriate universal resource locator (URL) address on the browser application 10. The web interface 33 can in turn communicate with other internal computerized applications 35 in the financial services provider network 30. The client information and data received at the web interface application 33 can be verified and processed by internal applications 35. Also, the information may be accessed or stored in internal data storage or database applications 37. The web interface 33 will enable a client to set-up and authorize ACH transactions in an automated self-service manner that eliminates the need for the client to contact and interact with a customer service representative. All necessary information will be provided to the financial service provider via the computerized web interface 33. Further, the web interface 33 can be made continuously available to clients thereby permitting clients to set and authorize ACH transaction at a time and day that is convenient for the client.

In step S20, secure access to the web interface 33 is provided so that a client can enter client specific information, data and parameters to appropriately setup and authorize ACH transactions. A client may be required to enter proper identification and passwords to authenticate the client as an authorized user who is allowed to access the web interface 33. Once the entered identification and password have been accepted, the client, via the client computer 20 and internet 25, will be provided with a secure communications connection to the financial services provider web interface 33. Additionally, the web interface 33, server application 31 and the client computer 20 may include software applications and algorithms that can provide digital signatures and encryption and decryption capabilities to further ensure the integrity and security of information and data being transmitted between the web interface application 33 and the client computer 20.

Once the client is securely connected to the online program or application 33, the client can enter necessary set-up and authorization information and data to authorize the transfer of their funds from third party banks or financial institutions 40.

In step S30, the client enters or inputs set-up and authorization information, data and transaction parameters for desired ACH transactions. The information can include the routing number of the client or third party financial institution from which funds will be debited. The client may also enter specific client account information at the client or third party financial institution for the account or accounts that will be the source of the client funds to be transferred in the ACH transaction. The client may also enter data that indicates which financial services institution and which client account or accounts in the financial services provider will be designated to receive the transferred funds in the authorized ACH transaction.

The client can also enter client specific criteria or conditions that will determine under which circumstances ACH transactions are authorized and can automatically occur so that the funds can be electronically transferred into the client selected account or accounts. The client can enter parameters or data that indicate whether an ACH transaction is a one time occurrence or whether the ACH transaction is being set up and authorized to occur on a regular periodic bases. For example, to occur monthly, semi-annually or yearly or on some other defined time period. In particular, the client may set up and authorize recurring, non-recurring or one-time ACH transactions. The client can also enter parameters on whether the amount of funds to be transferred in the ACH transaction is a fixed amount or a variable amount dependent on client or financial services provider defined conditions or events. The client can also indicate that the ACH transactions can be occur automatically or require additional client authorization each time an ACH transaction funds transfer is to be made.

In one aspect, the client can designate parameters for authorization of ACH-in transactions of funds from the client's third party financial institutions 40 to designated one or more accounts at the financial services provider 30. This can include the date of authorized ACH-in transactions, amount of funds to be transferred and the frequency of occurrence of the ACH-in transactions, i.e., a one-time, recurring or non-recurring ACH-in transaction, along with other client defined parameters for an ACH-in transaction.

In Step S40, the client's set-up and authorization for ACH transactions are accepted an acknowledge via the web interface 33. The client's inputted set-up and authorization information and parameters are preferably stored 37 and can later be accessed as needed by appropriate programs or applications 35 in the financial services provider network 30 to automatically execute any authorized ACH transactions, and in one aspect, ACH-in transactions.

In Step S50, upon the occurrence of pre-defined client parameters and instructions, the authorized ACH transactions are automatically executed and carried out to electronically transfer funds between designated accounts. The client has previously authorized the financial services provider to draft on the client's account located in the client's third party financial institution, e.g., a bank 40. In one example, shown in FIG. 2, the initiation and execution of the authorized ACH transaction is carried out through information exchange and communication between appropriate computer applications 35 and 45 of the financial services provider network 30, the client third-party financial institution 40 and the ACH electronic payment network 50. Further, the financial services provider network 30, the client third party financial institution 40 and the ACH electronic payment network 50 may use the internet 25 for communication and information exchange as necessary to carryout an ACH transaction.

In one example, an ACH-in transaction is authorized and the client's funds will automatically and electronically be debited at the designated client third-party bank account and electronically transferred into the one or more designated client accounts at the financial services provider. In one example, a client having accounts with a financial services provider such as American Express Financial Services may set up and authorize automatic ACH-in transactions to fund one or more designated accounts including Brokerage ONE accounts, SPS Brokerage accounts, Basic Brokerage accounts, AXP Mutual Funds, Prop funds, Certificates, Insurance, Annuities and ONE High Yield Savings Accounts.

In Step S60, the online or web interface 33 provided by a financial services provider 30 is available for access by the client so that a client is provided with the ability to modify, in a secure manner, the client's set-up information and parameters authorizing ACH transactions. The client may simply log-on to the web interface 33 and enter new or modified set-up and authorization parameters or criteria for automatic occurrence of ACH transactions. The client may enter new routing and account numbers for different or additional client third party banks and bank accounts. The client may also change the amount of funds to be transferred and whether authorized ACH transactions will be recurring, non-recurring or one-time ACH transactions. Once done, the client can store set-up and authorization modifications preferably in storage locations or databases 37 of the financial service provider 30.

In Step S70, the financial services provider can provide the client with an acknowledgement or confirmation that their set-up and authorization data, parameters or criteria, as entered and received via the web interface 33, have been received and stored. The acknowledgement can be provided through an electronic communication, such as e-mail, or by generating a written document and mailing it to the client. The acknowledgement or confirmation can be done for both the initial set-up and authorization and for subsequent client modifications.

In Step S80, after an ACH transaction has been carried out, a notification can be generated and communicated to the client. The notification can be generated by financial services provider applications 31 and 35. The ACH transaction notice can be sent electronically through the internet 25 and a web server application 31 or printed and mailed to the client. The notice can include information relating to the date of the transaction, the amount of funds transferred, the client accounts involved, an indication that a successful transaction of funds occurred from and to the selected accounts, as well as any client requested information.

In step S90, the financial services provider 30 can provide clients with the ability to request information relating to previously entered set-up and authorization parameters. The storage of client set-up and authorization parameters in storage locations and databases 37, accessible by financial services provider applications 31 and 35, enable the financial services provider to generate and deliver ACH transaction history reports to a client upon request. A client may also be able to request such information via the web interface 33. Additionally, a client may contact a customer or service representative and request information over the phone or hard copies through the mail. The customer or service representative may access the requested information that has been previously stored in financial services provider storage locations and databases 37, including client set-up and authorization and history of executed ACH-In transactions. The stored information may also be accessed by authorized employees or personnel for purposes of generating reports to conduct analysis of how well the online client authorized ACH transactions process is functioning.

Certain preferred examples have been described and illustrated by way of example only. Those skilled in that art will recognize that the preferred examples may be altered or amended without departing from the inventive spirit and scope of the subject matter. Therefore, the subject matter is not limited to the specific details, representative devices, and illustrated examples in this description. The novel subject matter is limited only by the following claims and equivalents.

We claim:

1. A method for a client to authorize an automated clearing house (ACH) transaction via the world wide web, the method comprising the steps of:
   receiving authentication credentials to access an online web interface to a financial provider network, wherein the financial provider network comprises a second account which is an investment account of the client that is supplemented with funds from the ACH transaction;
   receiving ACH transaction parameters, after verification of the authentication credentials, including whether the ACH transaction from a first account to the second account is at least one of one-time, recurring, and scheduled;
   receiving an ACH authorization to issue an ACH credit to the second account;
   storing the ACH transaction parameters in a database;
   determining a balance change condition in the second account;
   invoking the authorized ACH transaction based upon the determination of the balance change condition associated with the second account;
   creating an ACH entry based on the ACH authorization;
   executing the authorized ACH transaction based on the ACH transaction parameters; and,
   providing the ACH entry to an Originating Depository Financial Institution, wherein the ACH entry is sent to an ACH Operator and passed to a Receiving Depository Financial Institution (RDFI) causing the RDFI to debit the first account and credit the second account.

2. The method of claim 1, further comprising the steps of:
   modifying the ACH transaction parameters to create modified ACH transaction parameters;
   storing the modified ACH transaction parameters in a database; and
   providing notice of an executed ACH transaction.

3. The method of claim 2, further comprising the step of providing access to the ACH transaction parameters and ACH transactions history.

4. The method of claim 3, wherein the ACH transaction is an ACH-in transaction that electronically transfers client funds from a client account at a third party financial institution to a client account at a financial service provider.

5. The method of claim 4, wherein the ACH transaction parameters comprise:
   a routing number for a client third party financial institution,
   a client account number at the client third party financial institution and financial service provider; and,
   an amount of funds to be transferred between a client account in the client third party financial institution and a client account at the financial service provider.

6. A method for authorizing an automated clearing house (ACH) transaction, the method comprising the steps of:
   entering authentication credentials to access an online web interface to a financial provider network, wherein the financial provider network comprises a second account which is an investment account of the client that is supplemented with funds from the ACH transaction;
   accessing the online web interface when the authentication credentials are verified,
   defining ACH transaction parameters including whether the ACH transaction from a first account to the second account is at least one of one-time, recurring, and scheduled;
   sending an ACH authorization for the financial provider network to issue an ACH credit to the second account upon determining a balance change condition in the second account, wherein the authorized ACH transaction is invoked based upon the determination of the balance change condition associated with the second account, and wherein an ACH entry is created based on the ACH authorization and provided to an Originating Depository Financial Institution, wherein the ACH entry is sent to an ACH Operator and passed to a Receiving Depository Financial Institution (RDFI) causing the RDFI to debit the first account and credit the second account.

7. The method of claim 6, further comprising the steps of:
   receiving notification of the executed ACH transaction; and,
   modifying the ACH transaction parameters.

8. The method of claim 7, wherein the access to the online web interface is via a computer having a web browser application.

9. The method of claim 7, wherein the ACH transaction is an ACH-in transaction.

10. The method of claim 7, wherein the inputted ACH transaction parameters include information selected from the group comprising:
    a routing number for a third party financial institution;
    an account number at a third party financial institution; and,
    an amount of funds to be transferred.

11. A method for a client to individually set-up and authorize an automated clearing house (ACH) in transaction, the method comprising the steps of:
    providing an online web interface on a financial services provider network to enable the client to define ACH-in transaction parameters including whether the ACH-in transaction from a first account to a second account is at least one of one-time, recurring, and scheduled, wherein the financial services provider network comprises the second account which is an investment account of the client that is supplemented with funds from the ACH transaction;
    allowing the client to securely access the online web interface via a client computer having a web browser application;
    storing and acknowledging the ACH-in transaction parameters;
    receiving an ACH authorization to issue an ACH credit to the second account;
    determining a balance change condition in a second account;
    invoking the authorized ACH transaction based upon the determination of the balance change condition associated with the second account;

creating an ACH entry based upon the ACH authorization;

automatically executing an authorized ACH-in transaction based on the ACH-in transaction parameters;

providing the ACH entry to an Originating Depository Financial Institution, wherein the ACH entry is sent to an ACH Operator and passed to a Receiving Depository Financial Institution (RDFI) causing the RDFI to debit the first account and credit the second account;

notifying the client of the completed ACH-in transaction; and enabling the client to modify the ACH-in transaction parameters.

12. The method of claim 11, further comprising the step of storing and acknowledging the modified ACH-in transaction parameters.

13. The method of claim 12, wherein the ACH-in transaction parameters comprises:
- a routing number for a client third party financial institution,
- a client account number at the client third party financial institution and financial service provider; and,
- an amount of funds to be transferred between a client account in the client third party financial institution and a client account at the financial service provider.

* * * * *